US012273859B2

(12) United States Patent
Luo et al.

(10) Patent No.: US 12,273,859 B2
(45) Date of Patent: Apr. 8, 2025

(54) UE INFORMATION REPORTING METHOD, INTERNET OF VEHICLES RESOURCE CONFIGURATION METHOD, AND APPARATUSES

(71) Applicant: ZTE Corporation, Guangdong (CN)

(72) Inventors: Wei Luo, Shenzhen (CN); Lin Chen, Shenzhen (CN); Mengzhen Wang, Shenzhen (CN); Boyuan Zhang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 555 days.

(21) Appl. No.: 17/513,506

(22) Filed: Oct. 28, 2021

(65) Prior Publication Data

US 2022/0150871 A1 May 12, 2022

Related U.S. Application Data (63) Continuation of application No. PCT/CN2020/086944, filed on Apr. 26, 2020.

(30) Foreign Application Priority Data

Apr. 30, 2019 (CN) .......................... 201910364364.0

(51) Int. Cl.
*H04W 72/02* (2009.01)
*H04L 1/1812* (2023.01)
(Continued)

(52) U.S. Cl.
CPC ........... *H04W 72/02* (2013.01); *H04L 1/1812* (2013.01); *H04W 72/23* (2023.01); *H04W 72/30* (2023.01); *H04W 72/56* (2023.01)

(58) Field of Classification Search
CPC ... H04L 1/1812; H04L 1/1822; H04L 1/1861; H04L 2001/0093; H04W 4/40;
(Continued)

(56) References Cited

U.S. PATENT DOCUMENTS 10,117,224 B2 * 10/2018 Baghel .................. H04W 72/00
10,136,266 B2 * 11/2018 Ahmad ................... H04L 67/14
(Continued)

FOREIGN PATENT DOCUMENTS

AU 2018455860 B2 * 9/2024 ............... H04L 1/08
CA 3000752 A1 * 5/2017 ............ H04W 72/02
(Continued)

OTHER PUBLICATIONS

Extended European Search Report for corresponding application EP 20798587.0 dated Oct. 27, 2022, 12p.
(Continued)

*Primary Examiner* — Eric Nowlin
(74) *Attorney, Agent, or Firm* — Crowell & Moring LLP (57) ABSTRACT

Provided are a user equipment (UE) information reporting method and apparatus, an internet of vehicles resource configuration method and apparatus, and a storage medium. The reporting method includes the following steps: a first UE acquires identification information of a second UE; and the first UE sends identification information of the second UE before an adjustment and identification information of the second UE after the adjustment to a network element device on a network side to report UE information.

15 Claims, 4 Drawing Sheets

(51) Int. Cl.
*H04W 72/23* (2023.01)
*H04W 72/30* (2023.01)
*H04W 72/56* (2023.01)

(58) Field of Classification Search
CPC . H04W 24/10; H04W 28/0278; H04W 72/02; H04W 72/20; H04W 72/21; H04W 72/23; H04W 72/30; H04W 72/56; H04W 76/14; H04W 76/40
See application file for complete search history.

(56) References Cited

U.S. PATENT DOCUMENTS

| | | | |
|---|---|---|---|
| 10,257,743 B2 | 4/2019 | Yi et al. | |
| 10,764,866 B2* | 9/2020 | Loehr | H04W 72/0446 |
| 10,827,380 B2* | 11/2020 | Rao | H04W 28/0268 |
| 11,240,642 B2* | 2/2022 | Ahmad | H04L 65/4061 |
| 11,387,963 B2* | 7/2022 | Ryu | H04L 5/0051 |
| 11,412,492 B2* | 8/2022 | Chae | H04W 72/20 |
| 11,647,503 B2* | 5/2023 | Zhao | H04W 72/569 370/329 |
| 11,943,720 B2* | 3/2024 | Yoshioka | H04W 4/06 |
| 11,974,267 B2* | 4/2024 | Yoshioka | H04W 72/542 |
| 12,010,547 B2* | 6/2024 | Kang | H04W 76/30 |
| 2017/0064534 A1* | 3/2017 | Loehr | H04L 67/51 |
| 2017/0094656 A1 | 3/2017 | Chen et al. | |
| 2018/0263026 A1* | 9/2018 | Loehr | H04W 72/56 |
| 2018/0359619 A1 | 12/2018 | Ma et al. | |
| 2019/0028877 A1* | 1/2019 | Loehr | H04W 8/005 |
| 2019/0141566 A1* | 5/2019 | Hong | H04W 28/04 |
| 2019/0239112 A1* | 8/2019 | Rao | H04L 1/08 |
| 2019/0320362 A1* | 10/2019 | Liu | H04W 28/0268 |
| 2020/0077287 A1* | 3/2020 | Prasad | H04W 72/30 |
| 2020/0092692 A1 | 3/2020 | Wang et al. | |
| 2020/0107218 A1 | 4/2020 | Wang et al. | |
| 2020/0313825 A1* | 10/2020 | Ryu | H04L 5/0053 |
| 2021/0105842 A1* | 4/2021 | Cheng | H04W 76/14 |
| 2021/0345313 A1* | 11/2021 | Basu Mallick | H04L 1/1825 |
| 2021/0377989 A1* | 12/2021 | Chae | H04L 1/1861 |
| 2021/0385845 A1* | 12/2021 | Zhao | H04L 1/1854 |
| 2022/0015043 A1* | 1/2022 | Yoshioka | H04W 52/243 |
| 2022/0060286 A1* | 2/2022 | Yoshioka | H04L 1/1854 |
| 2022/0070847 A1* | 3/2022 | Yoshioka | H04W 72/20 |
| 2022/0078805 A1* | 3/2022 | Yoshioka | H04L 1/1825 |
| 2022/0085955 A1* | 3/2022 | Zhao | H04W 24/10 |
| 2022/0150871 A1* | 5/2022 | Luo | H04L 1/1861 |
| 2022/0239416 A1* | 7/2022 | Zhao | H04L 5/0094 |
| 2022/0330236 A1* | 10/2022 | Chae | H04B 7/06954 |
| 2022/0345277 A1* | 10/2022 | Ryu | H04W 4/70 |
| 2022/0377599 A1* | 11/2022 | Kang | H04W 76/10 |
| 2023/0276359 A1* | 8/2023 | Xu | H04W 72/25 370/318 |

FOREIGN PATENT DOCUMENTS

| | | | | |
|---|---|---|---|---|
| CA | 3131039 A1 * | 8/2020 | | H04L 1/0031 |
| CN | 104811892 A | 7/2015 | | |
| CN | 107347215 A | 11/2017 | | |
| CN | 107950047 A | 4/2018 | | |
| CN | 108923894 A | 11/2018 | | |
| CN | 108990125 A | 12/2018 | | |
| CN | 109152076 A | 1/2019 | | |
| CN | 109644455 A | 4/2019 | | |
| CN | 110536445 A | 12/2019 | | |
| CN | 113170532 A * | 7/2021 | | H04L 1/08 |
| CN | 113261349 A * | 8/2021 | | H04L 1/1825 |
| CN | 114513856 A * | 5/2022 | | |
| EP | 3372028 B1 * | 2/2020 | | H04W 72/02 |
| EP | 3651523 A1 * | 5/2020 | | H04W 72/02 |
| EP | 3651523 B1 * | 9/2021 | | H04W 72/02 |
| EP | 3 890 246 A1 | 10/2021 | | |
| EP | 3905844 A1 * | 11/2021 | | H04L 1/08 |
| EP | 3911035 A1 * | 11/2021 | | H04L 1/1825 |
| EP | 3917051 A1 * | 12/2021 | | H04B 7/06954 |
| EP | 3920446 A1 * | 12/2021 | | H04L 1/0031 |
| EP | 3920625 A1 * | 12/2021 | | H04W 72/02 |
| EP | 4024943 A1 * | 7/2022 | | H04W 28/0263 |
| EP | 3884605 B1 * | 5/2023 | | H04B 7/06954 |
| JP | 2022525732 A * | 5/2022 | | |
| JP | 2022552100 A * | 12/2022 | | |
| JP | 7213893 B2 * | 1/2023 | | H04L 1/1825 |
| KR | 20200114828 A * | 10/2020 | | |
| WO | WO 2018/117775 A1 | 6/2018 | | |
| WO | WO-2020144825 A1 * | 7/2020 | | H04L 1/1825 |
| WO | WO-2020204494 A1 * | 10/2020 | | H04L 1/0026 |
| WO | WO 2020/221148 A1 | 11/2020 | | |
| WO | WO-2021034779 A1 * | 2/2021 | | H04B 7/06954 |
| WO | WO-2021066421 A1 * | 4/2021 | | H04W 28/0263 |

OTHER PUBLICATIONS

Partial Supplementary European Search Report for EP Application No. 20798587.0 dated Jul. 20, 2022, 12p.
Ericcson, "Remaining details on physical structure for NR SL", 3GPP TSG-RAN WG1 Meeting #96, R1-1903163, Mar. 1, 2019, 12p, GR.
Examination Report for corresponding Indian application No. 202117050014 dated Nov. 10, 2023, 8p, in Indian and English languages.
Official Action for corresponding Japanese application No. 2021-564492 mailed Nov. 30, 2023, 2p, in Japanese language.
English language translation of Official Action (Notice of Reasons for Rejection) for corresponding Japanese application No. 2021-564492 mailed Nov. 30, 2023, 5p.
Intel, "Transport options for Public Safety Discovery", 3GPP TSG-SA WG2 Meeting #106, S2-144286, Nov. 21, 2014, 10p, US.
Intel Corporation, "Physical Layer Procedures for NR V2X Sidelink Design", 3GPP TSG RAN WG1 Meeting #96, R1-1903450, Mar. 1, 2019, 16p, GR.
Lenovo et al., "Discussion on QoS management for NR V2X", 3GPP TSG RAN WG2 Meeting #103bis, R2-1814755, Oct. 12, 2018, 6p, CN.
International Search Report for priority application No. PCT/CN2020/086944 dated Jul. 16, 2020, 9p. in English and Chinese languages.
Written Opinion for priority application No. PCT/CN2020/086944 dated Jul. 16, 2020, 6p, in Chinese language.
ZTE et al., Discussion on the Necessity of V2X Path Configuration Signalling, 3GPP TSG-RAN WG2 Meeting #96 R2-168146, Section 2, Nov. 4, 2016, 4p.
Ericsson, "Feature Lead Summary #2 on Resource Allocation for NR Sidelink. Mode 1", 3GPP TSG-RAN WG1 Meeting #96bis R1-1905834, Sections 2-9, Apr. 15, 2019, 22p.
Concise Explanation for A11.
Examination Report for corresponding application No. EP 20798587.0 dated Mar. 20, 2024, 4p.
First Office Action dated Aug. 29, 2024 in Chinese Patent Application No. 20190364364.0.

* cited by examiner

UE INFORMATION REPORTING METHOD, INTERNET OF VEHICLES RESOURCE CONFIGURATION METHOD, AND APPARATUSES

This application is a continuation of International Application No. PCT/CN2020/086944, filed Apr. 26, 2020, which claims priority to Chinese Patent Application No. 201910364364.0 filed with the China National Intellectual Property Administration (CNIPA) on Apr. 30, 2019, the disclosure of both of which are incorporated herein by reference in their entireties.

TECHNICAL FIELD

The present application relates to radio communication networks and, in particular, to a user equipment (UE) information reporting method and apparatus, an internet of vehicles resource configuration method and apparatus, and a storage medium.

BACKGROUND

The internet of vehicles is a system network constructed according to an agreed communication protocol and a data interaction standard. Communication based on the internet of vehicles is collectively referred to as information exchange communication between a vehicle and an outside (V2X, vehicle to X). A vehicle can perform radio communication and information exchange with a vehicle, a pedestrian, a roadside device and the Internet through V2X. With technological progress and the development of automation, V2X communication scenarios extend from the 3rd Generation Partnership Project (3GPP) for the standardization of the third generation of mobile communications to the 5th generation of mobile communications (5G) and have higher performance requirements. At present, for the internet of vehicles communication based on 5G New Radio (NR) air interface and the internet of vehicles communication based on 5G sidelink, there are no UE information reporting and resource configuration schemes based on 5G sidelink.

SUMMARY

The present application provides a UE information reporting method and apparatus, an internet of vehicles resource configuration method and apparatus, and a storage medium.

An embodiment of the present application provides a UE information reporting method. The method includes steps described below.

A first UE acquires identification information of a second UE.

The first UE sends identification information of the second UE before an adjustment and identification information of the second UE after the adjustment to a network element device on a network side to report UE information.

An embodiment of the present application provides an internet of vehicles resource application method. The method includes steps described below.

A first UE acquires Layer 2 identification information of a second UE.

The first UE determines identification information of the second UE.

The first UE sends the identification information of the second UE to a network element device on a network side to apply for a resource configuration.

An embodiment of the present application provides an internet of vehicles resource configuration method. The method includes a step described below.

A UE receives sidelink bearer configuration information configured by a network element device on a network side.

The sidelink bearer configuration information includes at least one of target identification information, target UE information, or transmission type information An embodiment of the present application provides a method for a media access control (MAC) entity processing a priority of a logical channel. The method includes a step described below.

Priorities of logical channels are sorted in a descending order of priorities of following: a MAC control element for a cell radio network temporary identifier (C-RNTI) or data from an uplink common control channel (UL-CCCH); a MAC control unit for a sidelink retransmission buffer status report (BSR); and a MAC control unit for a sidelink BSR, where the sidelink BSR includes a sidelink BSR except a sidelink BSR for filling.

An embodiment of the present application provides a method for a MAC entity processing a priority of a logical channel. The method includes steps described below.

For a retransmission BSR, the MAC entity uses a priority of a logical channel having a highest priority and included in a transport block corresponding to the retransmission BSR as a priority of the retransmission BSR.

For a sidelink BSR, the MAC entity uses a priority of a logical channel having a highest priority and included in the sidelink BSR as a priority of the sidelink BSR.

An embodiment of the present application provides an internet of vehicles resource configuration method. The method includes steps described below.

A UE receives configuration information of a configure grant.

The UE sends data by using the configuration information of the configure grant.

The configuration information of the configure grant includes at least one of target identification information, target UE information, or transmission type information.

An embodiment of the present application provides an internet of vehicles resource configuration method. The method includes steps described below.

A UE receives a hybrid automatic repeat request (HARQ) process identification (ID) list.

The UE determines an HARQ process ID according to the HARQ process ID list.

The HARQ process ID list indicates an HARQ process ID list usable by the UE in a resource allocation mode in which the UE selects transmission resources.

An embodiment of the present application provides an internet of vehicles resource configuration method. The method includes steps described below.

A first UE acquires information about UEs in a sidelink multicast communication group.

The first UE determines physical sidelink feedback channel (PSFCH) resource information of the UEs in the sidelink multicast communication group.

An embodiment of the present application provides a UE information reporting apparatus. The apparatus includes a first acquisition module and a first sending module.

The first acquisition module is configured to acquire identification information of a second UE.

The first sending module is configured to send identification information of the second UE before an adjustment and identification information of the second UE after the adjustment to a network element device on a network side to report UE information.

An embodiment of the present application provides an internet of vehicles resource application apparatus. The apparatus includes a second acquisition module, a first determination module, and a second sending module.

The second acquisition module is configured to acquire Layer 2 identification information of a second UE.

The first determination module is configured to determine identification information of the second UE.

The second sending module is configured to send the identification information of the second UE to a network element device on a network side to apply for a resource configuration.

An embodiment of the present application provides an internet of vehicles resource configuration apparatus. The apparatus includes a first receiving module.

The first receiving module is configured to receive sidelink bearer configuration information configured by a network element device on a network side.

The sidelink bearer configuration information includes at least one of target identification information, target UE information, or transmission type information.

An embodiment of the present application provides an apparatus for a MAC entity processing a priority of a logical channel. The apparatus includes a first priority sorting module.

The first priority sorting module is configured to sort priorities of logical channels in a descending order of priorities of following: a MAC control element for a C-RNTI or data from a UL-CCCH; a MAC control unit for a sidelink retransmission BSR; and a MAC control unit for a sidelink BSR, where the sidelink BSR includes a sidelink BSR except a sidelink BSR for filling.

An embodiment of the present application provides an apparatus for a MAC entity processing a priority of a logical channel. The apparatus includes a second priority sorting module. The second priority sorting module is configured to perform operations described below.

For a retransmission BSR, the MAC entity uses a priority of a logical channel having a highest priority and included in a transport block corresponding to the retransmission BSR as a priority of the retransmission BSR.

For a sidelink BSR, the MAC entity uses a priority of a logical channel having a highest priority and included in the sidelink BSR as a priority of the sidelink BSR.

An embodiment of the present application provides an internet of vehicles resource configuration apparatus. The apparatus includes a second receiving module.

The second receiving module is configured to receive configuration information of a configure grant.

A UE sends data by using the configuration information of the configure grant.

The configuration information of the configure grant includes at least one of target identification information, target UE information, or transmission type information.

An embodiment of the present application provides an internet of vehicles resource configuration apparatus. The apparatus includes a third receiving module and a second determination module.

The third receiving module is configured to receive an HARQ process ID list.

The second determination module is configured to determine an HARQ process ID according to the HARQ process ID list.

The HARQ process ID list indicates an HARQ process ID list usable by a UE in a resource allocation mode in which the UE selects transmission resources.

An embodiment of the present application provides an internet of vehicles resource configuration apparatus. The apparatus includes a third acquisition module and a third determination module.

The third acquisition module is configured to acquire information about UEs in a sidelink multicast communication group.

The third determination module is configured to determine PSFCH resource information of the UEs in the sidelink multicast communication group.

An embodiment of the present application provides a storage medium. The storage medium stores a computer program, where the computer program, when executed by a processor, causes the processor to perform any one of the UE information reporting method and the internet of vehicles resource configuration methods in embodiments of the present application.

In the present application, a first UE acquires identification information of a second UE; and the first UE sends identification information of the second UE before an adjustment and identification information of the second UE after the adjustment to a network element device on a network side to report UE information, thereby reporting UE information based on 5G sidelink.

The preceding embodiments and other aspects of the present application and implementations thereof are described in more detail in the brief description of drawings, detailed description, and claims.

DETAILED DESCRIPTION

Embodiments of the present application are described below in conjunction with drawings. It is to be noted that if not in collision, embodiments of the present application and features therein may be combined with each other in any manner.

Figure 1:
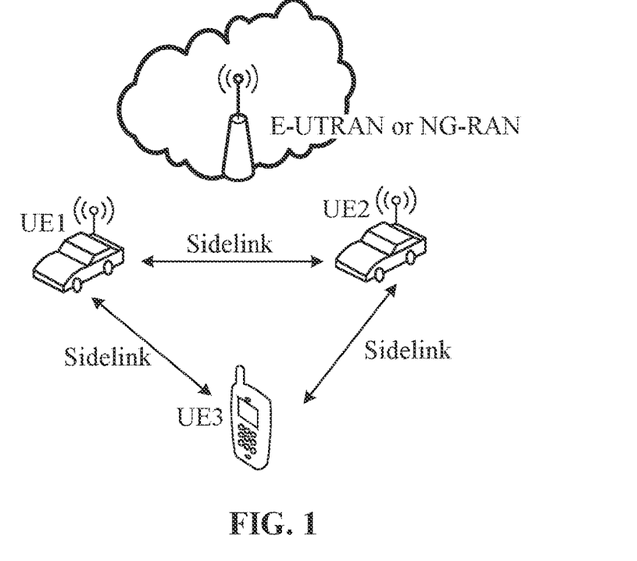
FIG. 1 is a schematic diagram of a scenario of an internet of vehicles architecture according to an embodiment of the present application.

The internet of vehicles refers to a large system network for radio communication and information exchange between a vehicle and a vehicle, between a vehicle and a pedestrian, between a vehicle and a roadside device, and between a vehicle and the Internet in accordance with an agreed communication protocol and a data interaction standard. The internet of vehicles communication ensures the driving safety of the vehicle, improves transport efficiency, and provides convenience or entertainment information. According to objects involved in radio communication, the internet of vehicles communication includes three different types: vehicle-to-vehicle (V2V) communication, vehicle-to-infrastructure/vehicle-to-network (V2I/V2N) communication and vehicle-to-pedestrian (V2P) communication, which are collectively referred to as the V2X communication. In a Long-Term Evolution (LTE)-based V2X communication research of the 3GPP, a V2X communication method based on sidelink between UEs is one of manners of implementing V2X standards, that is, traffic data is directly transmitted by a source UE to a target UE through an air interface without being forwarded by a base station and a core network. As shown in FIG. 1, FIG. 1 is a schematic diagram of a scenario of V2X architecture according to an embodiment of the present application. As shown in FIG. 1, manners of the communication between UEs via the sidelink in the internet of vehicles architecture may be V2X communication manners, which are simply referred to as PC5-based V2X communication or V2X sidelink communication.

With technological progress and the development of automation, V2X communication scenarios further extend and have higher performance requirements. Advanced V2X traffic is mainly divided into four categories: vehicle platooning, extended sensors, advanced driving (semi-automated or full-automated driving), and remote driving. Performance requirements to be satisfied are as follows: a supported packet size of 50 to 12000 bytes, a transmission rate of 2 to 50 messages per second, a maximum end-to-end latency of 3 to 500 ms, a reliability of 90% to 99.999%, a data rate of 0.5 to 1000 Mbps, and a supported transmission range of 50 to 1000 m. The 3GPP has approved a research on 5G-based internet of vehicles communication including the internet of vehicles communication based on 5G air interface and the internet of vehicles communication based on 5G sidelink. Therefore, the embodiments of the present application provide a resource configuration scheme based on 5G sidelink.

Figure 2:
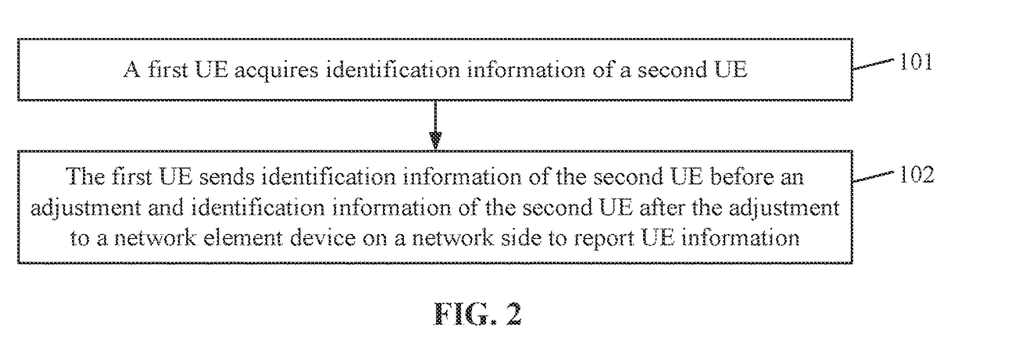
FIG. 2 is flowchart one of a UE information reporting method according to an embodiment of the present application.

FIG. 2 is flowchart one of a UE information reporting method according to an embodiment of the present application. As shown in FIG. 2, the method includes steps described below.

In S101, a first UE acquires identification information of a second UE.

In S102, the first UE sends identification information of the second UE before an adjustment and identification information of the second UE after the adjustment to a network element device on a network side to report UE information.

In an example embodiment, the identification information of the second UE includes Layer 2 identification information of the second UE.

Figure 3:
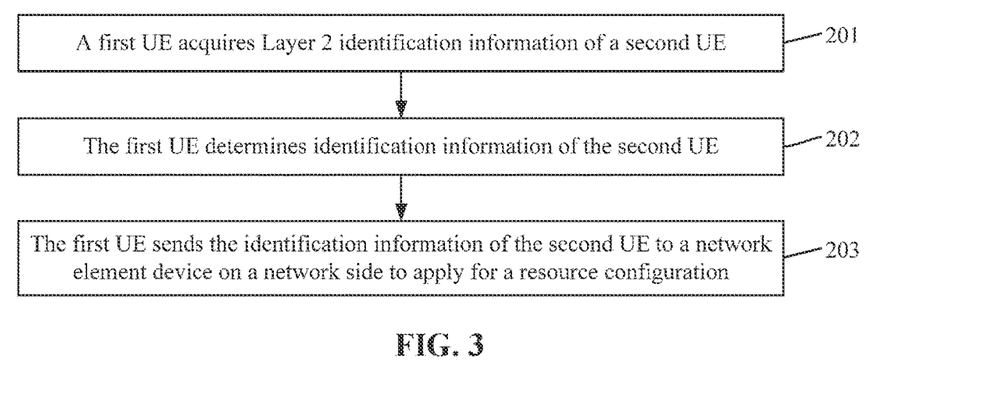
FIG. 3 is flowchart one of an internet of vehicles resource application method according to an embodiment of the present application.

FIG. 3 is flowchart one of an internet of vehicles resource application method according to an embodiment of the present application. As shown in FIG. 3, the method includes steps described below.

In S201, a first UE acquires Layer 2 identification information of a second UE.

In S202, the first UE determines identification information of the second UE.

In S203, the first UE sends the identification information of the second UE to a network element device on a network side to apply for a resource configuration.

In an example embodiment, the step in which the first UE determines the identification information of the second UE includes a step described below.

The first UE uses the Layer 2 identification information of the second UE as the identification information of the second UE; or the first UE allocates UE identification information to the second UE.

In an example embodiment, in one case, the method further includes that after the first UE acquires the Layer 2 identification information of the second UE, the first UE uses the Layer 2 identification information of the second UE as an identifier of the second UE. In another case, the method further includes that after establishing a connection with the second UE, the first UE uses Layer 2 identification information of the second UE obtained for the first time as the identifier of the second UE.

The first UE receives Layer 2 identification information of the second UE again, associates the received Layer 2 identification information of the second UE with the identifier of the second UE, and updates the Layer 2 identification information of the second UE according to the received Layer 2 identification information of the second UE.

An internet of vehicles resource configuration method according to an embodiment of the present application includes a step described below.

In S301, a UE receives sidelink bearer configuration information configured by a network element device on a network side.

The sidelink bearer configuration information includes at least one of target identification information, target UE information, or transmission type information.

In an example embodiment, the transmission type information includes at least one of unicast, multicast, or broadcast.

In an example embodiment, the step in which the UE receives the sidelink bearer configuration information configured by the network element device on the network side includes that the UE receives service data protocol (SDAP) layer configuration information. The SDAP layer configuration information includes at least one of target identification information, target UE information, or transmission type information.

In an example embodiment, the transmission type information includes at least one of unicast, multicast, or broadcast.

A method for a MAC entity processing a priority of a logical channel according to an embodiment of the present application includes a step described below.

In S401, priorities of logical channels are sorted in a descending order of priorities.

The descending order of priorities includes: a MAC control element for a C-RNTI or data from a UL-CCCH; a MAC control unit for a sidelink retransmission BSR; and a MAC control unit for a sidelink BSR, where the sidelink BSR includes a sidelink BSR except a sidelink BSR for filling.

In an example embodiment, the descending order of priorities further includes: the MAC control element for the C-RNTI or the data from the UL-CCCH; the MAC control unit for the sidelink BSR, where the sidelink BSR includes the sidelink BSR except the sidelink BSR for filling; and the MAC control unit for the sidelink retransmission BSR.

A method for a MAC entity processing a priority of a logical channel according to an embodiment of the present application includes steps described below.

For a retransmission BSR, the MAC entity uses a priority of a logical channel having a highest priority and included in a transport block corresponding to the retransmission BSR as a priority of the retransmission BSR.

For a sidelink BSR, the MAC entity uses a priority of a logical channel having a highest priority and included in the sidelink BSR as a priority of the sidelink BSR.

Figure 4:
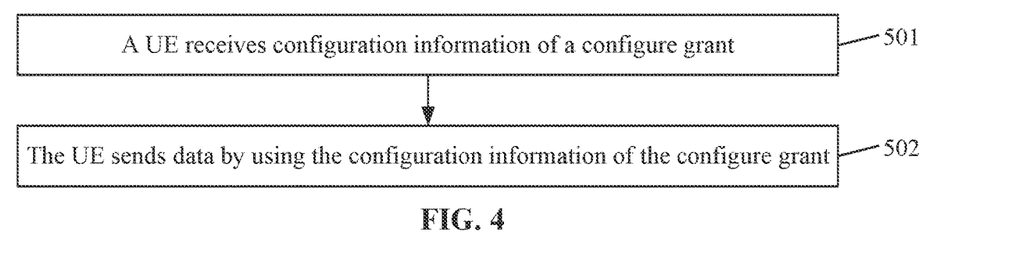
FIG. 4 is flowchart one of an internet of vehicles resource configuration method according to an embodiment of the present application.

FIG. 4 is flowchart one of an internet of vehicles resource configuration method according to an embodiment of the present application. As shown in FIG. 4, the method includes steps described below.

In S501, a UE receives configuration information of a configure grant.

In S502, the UE sends data by using the configuration information of the configure grant.

The configuration information of the configure grant includes at least one of target identification information, target UE information, or transmission type information.

In an example embodiment, the transmission type information includes at least one of unicast, multicast, or broadcast.

In an example embodiment, the configuration information of the configure grant further includes indication information of whether a transmission of a retransmitted packet is supported.

In an example embodiment, if the configuration information of the configure grant indicates that the transmission of the retransmitted packet is supported, when no newly transmitted packet arrives at a resource position indicated by configuration information of a configured grant, a retransmitted data packet may be sent at the resource position.

Figure 5:
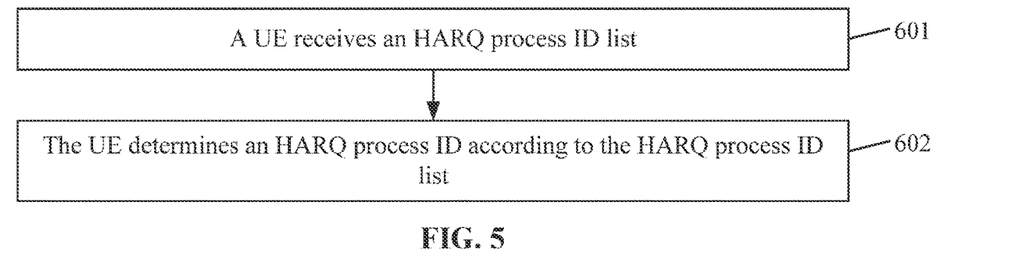
FIG. 5 is flowchart two of an internet of vehicles resource configuration method according to an embodiment of the present application.

FIG. 5 is flowchart two of an internet of vehicles resource configuration method according to an embodiment of the present application. As shown in FIG. 5, the method includes steps described below.

In S601, a UE receives an HARQ process ID list.

In S602, the UE determines an HARQ process ID according to the HARQ process ID list.

The HARQ process ID list indicates an HARQ process ID list usable by the UE in a resource allocation mode in which the UE selects transmission resources.

In an example embodiment, the HARQ process ID list is carried in a system message or radio resource control (RRC) dedicated signaling.

In an example embodiment, the HARQ process ID list may also be carried in configuration information of a sidelink resource pool.

In an example embodiment, the UE includes a UE that simultaneously supports a resource allocation mode in which scheduling is performed by a network element device on a network side and a resource allocation mode in which the UE selects transmission resources.

Figure 6:
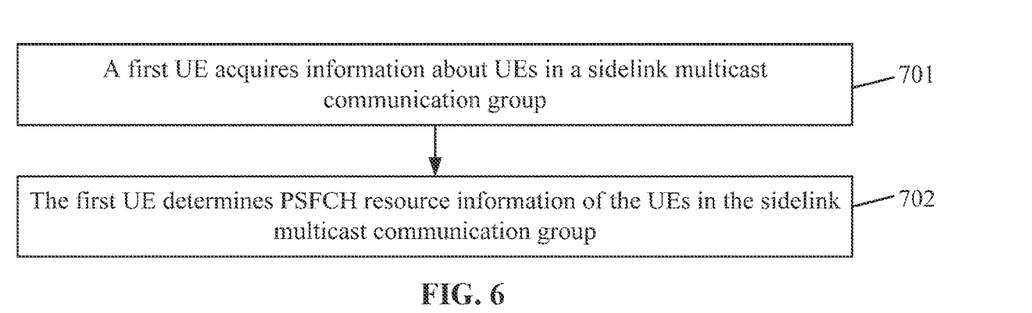
FIG. 6 is flowchart three of an internet of vehicles resource configuration method according to an embodiment of the present application.

FIG. 6 is flowchart three of an internet of vehicles resource configuration method according to an embodiment of the present application. As shown in FIG. 6, the method includes steps described below.

In S701, a first UE acquires information about UEs in a sidelink multicast communication group.

In S702, the first UE determines PSFCH resource information of the UEs in the sidelink multicast communication group.

In an example embodiment, after the first UE acquires the information about the UEs in the sidelink multicast communication group, the method further includes that the first UE sends the information about the UEs in the sidelink multicast communication group to a network element device on a network side; and the first UE receives the PSFCH resource information of the UEs in the sidelink multicast communication group.

In an example embodiment, the PSFCH resource information includes a PSFCH resource pool or N PSFCH resources. N is a quantity of receiver UEs in the group or a quantity of groups/categories of receiver UEs.

In an example embodiment, the information about the UEs in the group includes: identification information of the UEs in the group, quantity information of the UEs in the group, or category identification information of the UEs in the group.

In an example embodiment, the identification information of the UEs in the group is acquired in a manner described below.

A non-access stratum (NAS) of the UE notifies an access stratum (AS) of the first UE of the identification information of the UEs in the group.

Alternatively, the UE establishes connections with the UEs in the group and acquires the identification information of the UEs in the group.

In an example embodiment, the quantity information of the UEs in the group is acquired in the following manner: the NAS of the UE notifies the AS of the first UE of a quantity of the UEs in the group; or the UE establishes the connections with the UEs in the group and acquires the quantity information of the UEs in the group.

In an example embodiment, the category identification information of the UEs in the group is acquired in the following manner: the NAS of the UE notifies the AS of the first UE of category identifiers of the UEs in the group; or the UE establishes the connections with the UEs in the group and acquires category identifiers of the UEs in the group.

In an example embodiment, the method further includes that the first UE acquires information about the PSFCH resource pool. The step in which the first UE determines the PSFCH resource information of the UEs in the group includes that the first UE determines the PSFCH resource information of the UEs in the group according to the information about the UEs in the group and the information about the PSFCH resource pool.

In an example embodiment, after the first UE determines the PSFCH resource information of the UEs in the group, the method further includes that the first UE sends the PSFCH resource information to a second UE.

In an example embodiment, the method further includes that the first UE carries the PSFCH resource information of all the UEs in the group in sidelink control information (SCI). The PSFCH resource information of the UEs in the group includes identifiers of the UEs in the group and PSFCH resources corresponding to the identifiers. Alternatively, the PSFCH resource information of the UEs in the group includes the category identifiers of the UEs in the group and PSFCH resources corresponding to the category identifiers.

In an example embodiment, the PSFCH resource information of the UEs in the group may further include a PSFCH resource list. For example, if there are eight receiver UEs and eight resources are carried in the SCI, a receiver UE with an identifier of 1 uses a first resource, a receiver UE with an identifier of 2 uses a second resource, and so on.

In an example embodiment, the PSFCH resource information of the UEs in the group may further include a PSFCH resource list. For example, if there are eight categories of receiver UEs and eight resources are carried in the SCI, a receiver UE with a category identifier of 1 uses a first resource, a receiver UE with a category identifier of 2 uses a second resource, and so on.

Application Example

A research range of NR V2X includes sidelink unicast, sidelink multicast, and sidelink broadcast. Generally speaking, sidelink V2X communication may be divided into unicast, multicast, and broadcast. It is to be noted that sidelink unicast communication generally requires two UEs performing unicast communication to discover each other firstly and then initiate unicast-based sidelink V2X communication. Generally speaking, a sidelink discovery is also a broadcast-based transmission. In subsequent embodiments of the present application, sidelink broadcast generally refers to sidelink broadcast communication and the sidelink discovery.

Embodiment One

A base station needs to allocate sidelink resources to UEs. A general flow is described below.

The UEs firstly report sidelink UE information. If only broadcast and multicast are considered, the sidelink UE information includes the following:

receiver UE performing unicast communication and stores the UE id locally. Subsequently, the sender UE reports the UE id to the base station as the id of the receiver UE. A change of the Layer 2 id as an id of the receiver UE does not affect a change of the id of the receiver UE.

The sender UE notifies the base station of destination ids before and after an update. After receiving the information, the base station uses a new destination id when sending the SLRB configuration information. However, if only the destination id changes and other parameters remain unchanged in the configuration, updated SLRB configuration information does not need to be sent.

For NR V2X, in addition to reporting SL-DestinationInfoList, a cast type corresponding to the destination id also needs to be indicated. Optionally, a radio access type (RAT) corresponding to the destination id is also indicated. Further, a quality of service (QoS) corresponding to the destination id also needs to be indicated.

After acquiring the preceding information, the base station may configure an SLRB for a UE, which is similar to configuring a data radio bearer (DRB) of an LTE Uu interface. The base station configures an SDAP of each SL DRB, a Packet Data Convergence Protocol (PDCP) layer, each radio link control (RLC) bearer, a logical channel (LC), and the like, separately.

In the Uu interface, the UE configures the SDAP based on a different protocol data unit-session ID (PDU-SessionID), separately. However, for NR V2X, different destination ids need to be distinguished. Therefore, the SDAP may be configured based on a different destination id, and all configured instances of SDAP-Config with the same value of destination id correspond to the same SDAP entity).

Therefore, the destination id is included in an SDAP-Config information element (IE) or a DRB-ToAddMod IE.

Alternatively, destination id lists for unicast, multicast, and broadcast are directly listed in sequence and SL DRBs are configured in sequence based on destination ids.

```
SL-DestinationInfoList-r12 ::=    SEQUENCE (SIZE (1..maxSL-Dest-r12)) OF SL-
DestinationIdentity-r12
SL-DestinationIdentity-r12 ::=    BIT STRING (SIZE (24))
SL-V2X-CommFreqList-r14 ::=       SEQUENCE (SIZE (1..maxFreqV2X-r14)) OF INTEGER
(0..maxFreqV2X-1-r14)
SL-V2X-CommTxFreqList-r14 ::=             SEQUENCE (SIZE (1..maxFreqV2X-r14)) OF SL-V2X-
CommTxResourceReq-r14
SL-V2X-CommTxResourceReq-r14 ::=                 SEQUENCE {
   carrierFreqCommTx-r14                  INTEGER (0.. maxFreqV2X-1-r14)
   OPTIONAL,
   v2x-TypeTxSync-r14               SL-TypeTxSync-r14         OPTIONAL,
   v2x-DestinationInfoList-r14      SL-DestinationInfoList-r12    OPTIONAL
```

However, after unicast is introduced, since a Layer 2 identifier (id) of a receiver UE is generated by the receiver UE itself and often changes, if the Layer 2 id of the receiver UE changes, how the changed Layer 2 id is reported to the base station? The present application provides a solution below.

When a sender UE learns that the Layer 2 id of the receiver UE changes, the sender UE reports a new destination id list or reports a destination id list in the manner of adding and removing so as to save signaling. After receiving the information, the base station uses a new destination id when sending sidelink radio bearer (SLRB) configuration information.

When the sender UE establishes a connection with the receiver UE, the sender UE acquires the Layer 2 id of the receiver UE and uses the Layer 2 id as an id of the receiver UE. Alternatively, the sender UE allocates a UE id to the The base station configures corresponding DRB lists for UEs based on QoS flow identifiers (QFIs) corresponding to destination ids reported by the UEs. Then, according to SDAP configuration information, a destination id corresponding to each DRB ID may be determined so that the corresponding cast type and QFI are determined. SL logical channel ids are associated with DRB ids through RLC-BearerConfig, that is, one destination id may correspond to multiple DRBs and logical channel identifiers (LCIDs), but each DRB and LCID can correspond to only one destination id.

Embodiment Two

For a sidelink UE, a new BSR is introduced based on a retransmission resource application: a sidelink retransmission BSR.

A retransmission BSR includes one or more HARQ process ids.

The retransmission BSR is triggered when a negative acknowledgement (NACK) sent by a receiver UE is received.

The retransmission BSR is cancelled under any one of conditions described below.

If any HARQ process ID of a MAC entity has no data available for a retransmission, the triggered sidelink retransmission (Retx) BSR is cancelled.

If a certain HARQ process ID of the MAC entity has no data available for a retransmission, a sidelink Retx BSR associated with the HARQ process ID is cancelled.

When a sidelink Retx BSR is included in a MAC PDU to be transmitted, the sidelink Retx BSR is cancelled.

When an upper layer configures an autonomous resource selection, all triggered sidelink Retx BSRs are cancelled.

Further, a priority of a logical channel of the sidelink retransmission BSR needs to be considered in two manners described below.

(1) It is specified that a priority of the sidelink retransmission BSR is higher than that of a sidelink BSR.

(2) For a retransmitted transport block, the MAC entity needs to identify a logical channel having a highest priority among logical channel included in the retransmitted transport block and the priority of the logical channel having the highest priority in the transport block represents a priority of the transport block and the priority of the sidelink retransmission BSR. Then, the MAC entity compares the priority of the sidelink retransmission BSR with the priority of the sidelink BSR.

Embodiment Three

If a configure grant is allocated to broadcast traffic, corresponding acknowledgement (ACK)/NACK resources do not need to be allocated. If the configure grant is used for unicast traffic, ACK/NACK resources needs to be additionally applied for, which is relatively complicated. Therefore, a base station carries a usable cast type in configuration information of the configure grant.

Further, the base station may configure whether each configure grant supports a transmission of a retransmitted transport block. If a configure grant supports the transmission of the retransmitted transport block, the configure grant may be used for transmitting the retransmitted transport block, and a UE needs to determine whether a newly transmitted data packet or a retransmitted data packet is transmitted on the configure grant to determine a HARQ process id of the configure grant. If an LCID with a high priority is restricted on a configure grant, when a data packet of the LCID does not arrive, whether a newly transmitted data packet or a retransmitted data packet is transmitted on the configure grant is determined according to one with a higher priority between the retransmitted data packet and the newly transmitted data packet of an LCID with a low priority. A priority of the retransmitted data packet is determined according to a highest priority among priorities of at least one LCID included in the retransmitted data packet or determined according to a latency requirement included in the retransmitted data packet.

Embodiment Four

An HARQ process ID is calculated based on a symbol position of a configured grant resource. According to an agreed calculation formula, both a base station and a UE may determine the HARQ process ID. Then, for a V2X configured grant, an HARQ process ID may be calculated in a similar manner. For PC5 dynamic scheduling, HARQ process IDs may also be allocated by the base station. To distinguish different processes, a sender UE needs to carry an HARQ process ID in SCI. In addition, if the UE supports both scheduling by the base station (mode1) and a selection of transmission resources by the UE (mode2), since an HARQ process ID in mode2 is determined by the UE itself, the UE needs to negotiate with the base station to avoid a conflict of the HARQ process ID determined by the UE itself in mode2 with an HARQ process ID allocated by the base station through dynamic scheduling. For example, it is determined that the base station allocates an HARQ process ID list specific to mode2.

Embodiment Five

For multicast, if different PSFCHs or a PSFCH resource pool needs to be configured based on different UEs, the following scheme may be considered.

For dynamic scheduling, after receiving a BSR, a base station determines whether a resource applied for is used for unicast, multicast, or broadcast. If the resource is used for multicast, the base station needs to further determine the quantity of receiver UEs, divides the receiver UEs into N groups, and then allocates resources for transmitting data and N groups of ACK/NACK resources. For each multicast destination id, the quantity of receiver UEs or a category of a receiver UE is reported through sidelink UE information. For configured grant scheduling, the base station allocates resources based on UE auxiliary information. After receiving the N groups of ACK/NACK resources, a sender UE carries ACK/NACK resource positions in SCI. The receiver UE determines an ACK/NACK resource to be used according to the PSFCH resource pool, or the sender UE determines an ACK/NACK resource position of each receiver UE and indicates the ACK/NACK resource position of each receiver UE (one by one) through the SCI.

For multicast, if different UEs need to be configured with different PSFCHs, that is, for multicast, each receiver UE needs to be allocated with a different PSFCH resource, the base station needs to know the quantity of PSFCH resources to be allocated when allocating the PSFCH resources (the UE reports the quantity of PSFCH resources through sidelink UE information). Specifically, a PSFCH resource used by each receiver UE may be determined by the base station or the sender UE. For example, the sender UE carries PSFCH resource information via SCI signaling to indicate a PSFCH resource of a receiver UE corresponding to each destination id.

Then, the sender UE may know receiver UEs in a group and identifiers of the receiver UEs in the following manners: (1) an NAS notifies an AS; (2) the sender UE establishes unicast connections with all UEs in the group in advance to exchange information such as UE identifiers and PSFCH resources, but multicast messages are still sent in a multicast manner. If the sender UE establishes unicast connections with all the UEs in the group, the sender UE may allocate an intra-group identifier to each receiver UE after connections are established. The sender UE carries information about N PSFCH resources in the SCI when sending a data packet and the receiver UE determines a PSFCH resource used by the receiver UE according to the intra-group identifier of the receiver UE. (For example, if there are eight receiver UEs and eight resources are carried in the SCI, a receiver UE with an intra-group identifier of 1 uses a first resource, and a receiver UE with an intra-group identifier of 2 uses a second resource.)

Embodiment Six

For the allocation of sidelink resources, an exceptional resource pool is introduced to maintain the continuity of a sidelink transmission. When the sidelink transmission is possible to break, a UE randomly selects a resource from the exceptional resource pool for use. Specifically, several cases may be provided below.

A next-generation NodeB (gNB) configures that the UE uses mode1, a dynamic resource allocation mode.

If the UE detects a radio link failure (RLF), the UE cannot receive an SL grant from a base station, during which the UE may randomly select a resource from the exceptional resource pool.

The gNB configures that the UE uses mode 1, the dynamic resource allocation mode, and the gNB configures a configured grant of type 1.

If the UE detects the RLF, the UE cannot receive a dynamic SL grant from the base station. The following two cases may be considered.

Assuming that the configured grant of type 1 is configured with an SL logical channel allowed to use the configured grant, the UE may use the configured grant of type 1 for scheduling the associated SL logical channel and may consider using the exceptional resource pool to randomly select a resource for the sidelink transmission for other SL logical channels. It is to be noted that in this case, the UE uses two modes at the same time, that is, mode1 corresponding to the configured grant of type 1 and mode2 corresponding to an autonomous selection of a resource from the exceptional resource pool.

If the configured grant of type 1 is configured with no SL logical channel allowed to use the configured grant, the UE may consider temporarily using the configured grant of type 1 for transmitting all data packets. It is to be noted that the configured grant of type 1 is limited and periodic and cannot necessarily satisfy requirements for a UE buffer data volume and a transmission latency. If the UE is allowed to use the exceptional resource pool for transmitting data with a relatively high latency requirement or carrying part of data traffic at the same time in this case, it means that the UE also needs to use two modes at the same time.

The gNB configures that the UE uses mode 1, the dynamic resource allocation mode, and the gNB configures a configured grant of type 2.

If the UE detects the RLF, the UE cannot receive the SL grant from the base station. Several cases may be considered as follows.

A UE for which semi-persistent scheduling (SPS) of type 2 has been activated, if detecting the RLF, considers using an SPS grant for transmitting data of a logical channel for a corresponding traffic pattern. This manner has the following problem: a conflict is possible to occur during the RLF since the base station deactivates the SPS grant and allocates original SPS resources to other UEs for use.

The UE for which the SPS of type 2 has been activated, if detecting the RLF, considers using the SPS grant for transmitting the data of the logical channel for the corresponding traffic pattern and transmitting data of another logical channel using a resource in the exceptional resource pool. This manner has the following problem: a conflict is possible to occur during the RLF since the base station deactivates the SPS grant and allocates the original SPS resources to other UEs for use. In addition, this manner means that the UE also needs to use two modes at the same time.

The UE for which the SPS of type 2 has been activated, if detecting the RLF, considers using an SPS pattern for transmitting data of all logical channels. This manner has the following problem: a conflict is possible to occur during the RLF since the base station deactivates the SPS grant and allocates the original SPS resources to other UEs for use.

The UE for which the SPS of type 2 has been activated, if detecting the RLF, uses the exceptional resource pool for transmitting the data of all the logical channels. This manner is used in LTE V2X in the related art, that is, a mode switch is used.

Proposal 1: In the case where mode1 and mode2 are not supported at the same time, if the UE detects the RLF, the UE is allowed to either transmit data of all logical channels using the configured grant of type 1 or directly use the exceptional resource pool for a data transmission.

Proposal 2: In the case where mode1 and mode2 are configured at the same time, if the UE detects the RLF, the UE may transmit data of logical channels corresponding to mode1 using a mode2 resource pool available according to a sensing result and use the exceptional resource pool for the data transmission only when the mode2 resource pool is unavailable according to the sensing result.

The resource allocation mode configured by the gNB for the UE changes. The resource allocation mode is possible to change as follows.

The resource allocation mode changes from mode1 to mode2. In this case, the mode2 resource pool is possible to be unavailable according to the sensing result, so the UE needs to temporarily use the exceptional resource pool.

The resource allocation mode changes from mode2 to mode1. In this case, the UE may directly request a resource from the base station without using the exceptional resource pool.

The resource allocation mode changes from mode1 to mode1+mode2. In this case, if the configured resource allocation mode is associated with no logical channel/logical channel group, the UE may continue using mode1 and then transmit data of some logical channels/logical channel groups using the mode2 resource pool when the mode2 resource pool is available according to the sensing result. If the configured resource allocation mode is associated with a logical channel/logical channel group, the UE may temporarily use the exceptional resource pool or use the resource allocation mode mode1 for transmitting a data packet of the logical channel/logical channel group associated with the resource allocation mode mode2.

The resource allocation mode changes from mode2 to mode1+mode2. In this case, the UE may directly perform the data transmission in mode1 according to a configuration of the base station or by autonomously selecting data packets of some logical channels/logical channel groups and requesting a grant from the base station without using the exceptional resource pool.

The resource allocation mode changes from mode1+mode2 to mode1. In this case, the UE may directly request a resource from the base station without using the exceptional resource pool.

The resource allocation mode changes from mode1+mode2 to mode2. In this case, the UE may directly transmit data packets of all logical channels/logical channel groups in mode2 without using the exceptional resource pool.

The mode2 resource pool configured by the base station changes. In this case, the UE needs to sense a new mode2 resource pool. Before the new mode2 resource pool is available according to the sensing result, the UE may temporarily use mode1 resources for all data transmissions or perform data transmissions for the logical channel/logical channel group associated with mode2 through the exceptional resource pool for D and the UE may perform data transmissions through the exceptional resource pool for F.

It is to be noted that if the UE is allowed to select multiple mode2 resource pools for data transmissions in mode 2, whether the sensing result is available still needs to be considered. If all the selected resource pools are unavailable according to sensing results, the UE may use the exceptional resource pool firstly. If one or more resource pools are available according to their sensing results, the UE may use these resource pools.

The gNB configures resource allocation mode1 and resource allocation mode2 for the UE at the same time.

In this case, if the configured resource allocation mode is associated with no logical channel/logical channel group, the UE may use mode1 firstly and then transmit data of some logical channels/logical channel groups using the mode2 resource pool when the mode2 resource pool is available according to the sensing result. If the configured resource allocation mode is associated with the logical channel/logical channel group, the UE may temporarily use the exceptional resource pool or use the resource allocation mode mode1 for transmitting the data packet of the logical channel/logical channel group associated with the resource allocation mode mode2.

Proposal 3: In a non-RLF scenario, the case where the mode2 resource pool is unavailable according to the sensing result in a normal resource mode configuration still needs to be considered in NR V2X. In this case, the following methods may be considered: (1) the exceptional resource pool is used; (2) the resource allocation mode mode1 is temporarily used for transmitting all data (the base station is required to configure multiple modes at the same time and configure no association between the resource allocation mode and the logical channel/logical channel group).

When the UE is switched to a target cell or configured with a new secondary cell (SCell), a method mentioned in LTE V2X may be referred to in NR V2X, for example, a handover command may include an exceptional transmission resource pool of the target cell, thereby reducing transmission interruption. If the UE is configured with the base station as a synchronization source, the UE may use the transmission resource pool of the target cell before synchronized with the target cell. If the UE is configured with a global navigation satellite system (GNSS) as the synchronization source, the UE may use the transmission resource pool of the target cell when synchronized with the GNSS. If the handover command includes the exceptional transmission resource pool, the UE may randomly select a resource from the exceptional transmission resource pool as soon as the UE receives the handover command. If the UE is configured by the handover command to use resources scheduled by the base station, the UE may continuously use the exceptional transmission resource pool when a handover-related timer is running. If the UE is configured by the handover command to use autonomously selected resources, the UE may use the exceptional transmission resource pool before a resource pool corresponding to the autonomously selected resources is available according to a sensing result.

Specifically, in NR V2X, if multiple resource allocation modes are allowed to be configured at the same time and the resource allocation modes configured by the base station for the UE are associated with logical channels/logical channel groups, the UE may consider determining, according to modes corresponding to different logical channels, whether the exceptional resource pool is no longer used for transmitting data of a corresponding logical channel/logical channel group. If the resource allocation modes configured by the base station for the UE are associated with no logical channels/logical channel groups, the UE may stop using the exceptional resource pool at an earlier time of the time when the handover-related timer stops running or the time when the sensing result indicates availability.

Proposal 4: The exceptional transmission resource pool of the target cell included in the LTE V2X handover command may also be used in the NR V2X. If multiple resource allocation modes are allowed to be configured at the same time and the resource allocation modes configured by the base station for the UE are associated with logical channels/logical channel groups, the UE may consider determining, according to modes corresponding to different logical channels, whether the exceptional resource pool is no longer used for transmitting data of the corresponding logical channel/logical channel group. If the resource allocation modes configured by the base station for the UE are associated with no logical channels/logical channel groups, the UE may stop using the exceptional resource pool at the earlier time of the time when the handover-related timer stops running or the time when the sensing result indicates availability.

The following is to be noted.

1. A sender UE needs to report an identifier of a receiver UE to the base station. However, a source id of the receiver UE changes constantly. The following schemes are considered.

(1) When the UE learns that a destination id changes, the UE reports a new destination id list or reports a destination id list in the manner of adding and removing so as to save signaling. After receiving the information, the base station uses a new destination id when sending SLRB configuration information. However, if only the destination id changes and other parameters remain unchanged in the configuration, updated SLRB configuration information does not need to be sent.

(2) When the sender UE establishes a connection with the receiver UE, the sender UE acquires id information of the receiver UE as the id of the receiver UE and subsequently reports this id as the id of the receiver UE to the base station. A change of the destination id of the receiver UE does not affect a change of the id of the receiver UE.

(3) The base station is notified of destination ids before and after an update. After receiving the information, the base station uses a new destination id when sending the SLRB configuration information. However, if only the destination id changes and other parameters remain unchanged in the configuration, the updated SLRB configuration information does not need to be sent.

2. The destination id is included in an SDAP-Config IE or a DRB-ToAddMod IE.

Alternatively, destination id lists for unicast, multicast, and broadcast are directly listed in sequence and SL DRBs are configured in sequence based on destination ids.

The preceding content has been described in embodiment one and is not repeated here.

3. If a new Retx BSR is defined, an effect of the new Retx BSR on a priority of a logical channel needs to be considered. For a retransmitted transport block (TB), a MAC entity identifies a logical channel having a highest priority among logical channels included in the retransmitted TB, and a priority of the logical channel having the highest priority in the TB represents a priority of the TB. Then, the MAC entity compares a priority of a sidelink Retx BSR with a priority of a sidelink BSR.

The preceding content has been described in embodiment two and is not repeated here.

4. If multiple configured grants of type 1 or type 2 are configured in V2X, an indication of a cast type needs to be added in ConfiguredGrantConfig.

The preceding content has been described in embodiment three and is not repeated here.

5. If the UE simultaneously supports mode1 and mode2, the base station allocates an HARQ process ID list specific to mode2.

The preceding content has been described in embodiment four and is not repeated here.

6. If different UEs need to be configured with different PSFCHs, that is, for multicast, each receiver UE needs to be allocated with a different PSFCH resource, the base station needs to know the quantity of PSFCH resources to be allocated when allocating the PSFCH resources (the UE reports the quantity of PSFCH resources through sidelink UE information). A PSFCH resource used by each receiver UE may be determined by the base station or the sender UE. For example, the sender UE carries PSFCH resource information via SCI signaling to indicate a PSFCH resource of a receiver UE corresponding to each destination id.

Then, the sender UE may know receiver UEs in a group and identifiers of the receiver UEs in the following manners: (1) an NAS notifies an AS; (2) the sender UE establishes unicast connections with all UEs in the group in advance to exchange information such as UE identifiers and PSFCH resources, but multicast messages are still sent in a multicast manner. If the sender UE establishes unicast connections with all the UEs in the group, the sender UE may allocate an intra-group identifier to each receiver UE after connections are established. The sender UE carries information about N PSFCH resources in SCI when sending a data packet and the receiver UE determines a PSFCH resource used by the receiver UE according to the intra-group identifier of the receiver UE. (For example, if there are eight receiver UEs and eight resources are carried in the SCI, a receiver UE with an intra-group identifier of 1 uses a first resource, and a receiver UE with an intra-group identifier of 2 uses a second resource.)

The preceding content has been described in embodiment five and is not repeated here.

Figure 7:
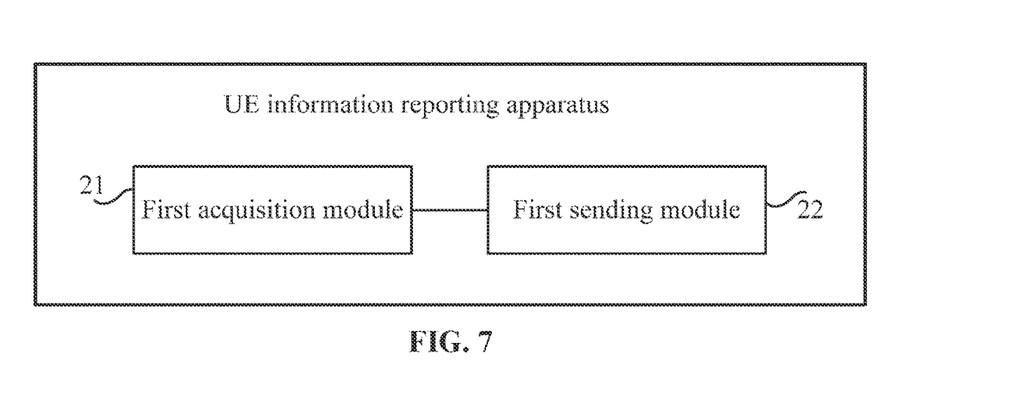
FIG. 7 is block diagram one of a UE information reporting apparatus according to an embodiment of the present application.

FIG. 7 is block diagram one of a UE information reporting apparatus according to an embodiment of the present application. As shown in FIG. 7, the apparatus includes a first acquisition module 21 and a first sending module 22. The first acquisition module 21 is configured to cause a first UE to acquire identification information of a second UE. The first sending module 22 is configured to cause the first UE to send identification information of the second UE before an adjustment and identification information of the second UE after the adjustment to a network element device on a network side to report UE information.

In an example embodiment, the identification information of the second UE includes Layer 2 identification information of the second UE.

An embodiment of the present application provides an internet of vehicles resource application apparatus. The apparatus includes a second acquisition module, a first determination module, and a second sending module. The second acquisition module is configured to cause a first UE to acquire Layer 2 identification information of a second UE. the first determination module is configured to cause the first UE to determine identification information of the second UE. The second sending module is configured to cause the first UE to send the identification information of the second UE to a network element device on a network side to apply for a resource configuration.

In an example embodiment, the first determination module is further configured to cause the first UE to use the Layer 2 identification information of the second UE as the identification information of the second UE or cause the first UE to allocate UE identification information to the second UE.

In an example embodiment, the apparatus further includes a first processing module. The first processing module is configured to cause the first UE to use the Layer 2 identification information of the second UE as an identifier of the second UE, cause the first UE to receive Layer 2 identification information of the second UE again, and cause the first UE to associate the received Layer 2 identification information of the second UE with the identifier of the second UE and update the Layer 2 identification information of the second UE according to the received Layer 2 identification information of the second UE.

An embodiment of the present application provides an internet of vehicles resource configuration apparatus. The apparatus includes a first receiving module which is configured to cause a UE to receive sidelink bearer configuration information configured by a network element device on a network side.

The sidelink bearer configuration information includes at least one of target identification information, target UE information, or transmission type information.

In an example embodiment, the transmission type information includes at least one of unicast, multicast, or broadcast.

In an example embodiment, the first receiving module is further configured to cause the UE to receive SDAP layer configuration information. The SDAP layer configuration information includes at least one of target identification information, target UE information, or transmission type information.

In an example embodiment, the transmission type information includes at least one of unicast, multicast, or broadcast.

An embodiment of the present application provides an apparatus for a MAC entity processing a priority of a logical channel. The apparatus includes a first priority sorting module. The first priority sorting module is configured to sort priorities of logical channels in a descending order of priorities of following: a MAC control element for a C-RNTI or data from a UL-CCCH; a MAC control unit for a sidelink retransmission BSR; and a MAC control unit for a sidelink BSR, where the sidelink BSR includes a sidelink BSR except a sidelink BSR for filling.

An embodiment of the present application provides an apparatus for a MAC entity processing a priority of a logical channel. The apparatus includes a second priority sorting module. The second priority sorting module is configured to: for a retransmission BSR, cause the MAC entity to use a priority of a logical channel having a highest priority and included in a transport block corresponding to the retransmission BSR as a priority of the retransmission BSR; and for a sidelink BSR, cause the MAC entity to use a priority of a logical channel having a highest priority and included in the sidelink BSR as a priority of the sidelink BSR.

An embodiment of the present application provides an internet of vehicles resource configuration apparatus. The apparatus includes a second receiving module. The second receiving module is configured to cause a UE to receive configuration information of a configure grant; and the UE sends data by using the configuration information of the configure grant. The configuration information of the configure grant includes at least one of target identification information, target UE information, or transmission type information.

In an example embodiment, the transmission type information includes at least one of unicast, multicast, or broadcast.

In an example embodiment, the configuration information of the configure grant further includes indication information of whether a transmission of a retransmitted packet is supported.

An embodiment of the present application provides an internet of vehicles resource configuration apparatus. The apparatus includes a third receiving module and a second determination module. The third receiving module is configured to cause a UE to receive an HARQ process ID list. The second determination module is configured to cause the UE to determine an HARQ process ID according to the HARQ process ID list. The HARQ process ID list indicates an HARQ process ID list usable by the UE in a resource allocation mode in which the UE selects transmission resources.

In an example embodiment, the HARQ process ID list is carried in a system message or RRC dedicated signaling.

In an example embodiment, the UE includes a UE that simultaneously supports a resource allocation mode in which scheduling is performed by a network element device on a network side and a resource allocation mode in which the UE selects transmission resources.

An embodiment of the present application provides an internet of vehicles resource configuration apparatus. The apparatus includes a third acquisition module and a third determination module. The third acquisition module is configured to cause a first EU to acquire information about UEs in a sidelink multicast communication group. The third determination module is configured to cause the first UE to determine PSFCH resource information of the UEs in the sidelink multicast communication group.

In an example embodiment, the apparatus further includes a third sending module and a fourth receiving module. The third sending module is configured to cause the first UE to send the information about the UEs in the sidelink multicast communication group to a network element device on a network side. The fourth receiving module is configured to cause the first UE to receive the PSFCH resource information of the UEs in the sidelink multicast communication group.

In an example embodiment, the PSFCH resource information includes a PSFCH resource pool or N PSFCH resources.

In an example embodiment, the information about the UEs in the group includes identification information of the UEs in the group or quantity information of the UEs in the group or category identification information of the UEs in the group.

In an example embodiment, the identification information of the UEs in the group is acquired in the following manner: an NAS of the UE notifies an AS of the first UE of identifiers of the UEs in the group; or the UE establishes connections with the UEs in the group and acquires the identification information of the UEs in the group.

In an example embodiment, the apparatus further includes a fourth acquisition module which is configured to cause the first UE to acquire information about the PSFCH resource pool. The third determination module is further configured to cause the first UE to determine the PSFCH resource information of the UEs in the group according to the information about the UEs in the group and the information about the PSFCH resource pool.

In an example embodiment, the apparatus further includes a fourth sending module which is configured to cause the first UE to send the PSFCH resource information to a second UE.

In an example embodiment, the apparatus further includes a second processing module which is configured to cause the first UE to carry the PSFCH resource information of all the UEs in the group in SCI. The PSFCH resource information of the UEs in the group includes the identifiers of the UEs in the group and PSFCH resources corresponding to the identifiers. Alternatively, the PSFCH resource information of the UEs in the group includes category identifiers of the UEs in the group and PSFCH resources corresponding to the category identifiers.

Figure 8:
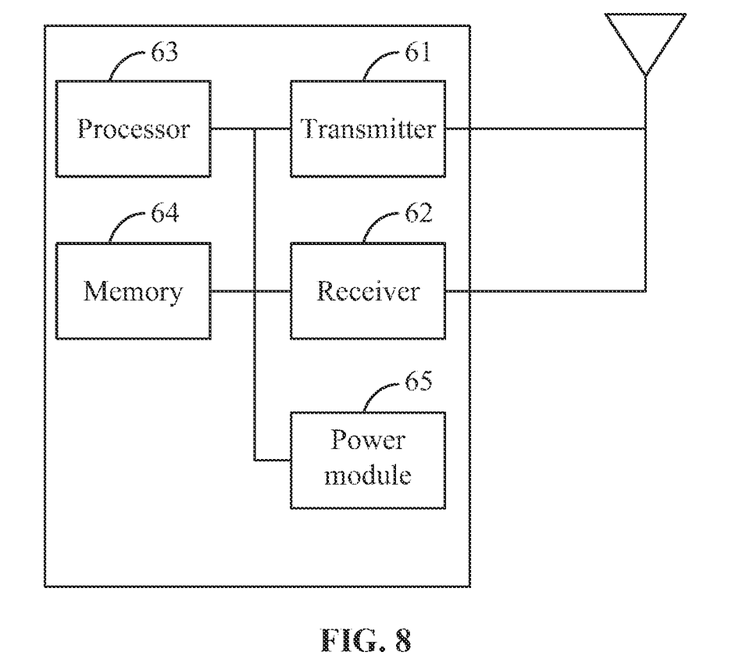
FIG. 8 is schematic diagram one of hardware of a reporting apparatus according to an embodiment of the present application.

FIG. 8 is schematic diagram one of hardware of a reporting apparatus according to an embodiment of the present application. A UE information reporting apparatus in an embodiment of the present application may be disposed on a terminal device side, that is, a first UE. As shown in FIG. 8, a terminal device may include a mobile terminal such as a mobile phone, a smart phone, a laptop, a digital broadcast receiver, a personal digital assistant (PDA), a PAD, a portable media player (PMP), and a navigation device and a fixed terminal such as a digital television (TV) and a desktop computer. It is assumed that a terminal is the mobile terminal hereinafter. However, those skilled in the art will understand that in addition to elements particularly used for a mobile purpose, a configuration according to an embodiment of the present application can also be applied to a fixed-type terminal.

The terminal device may include a radio communication unit which may specifically be composed of a transmitter 61, a receiver 62, a memory 64, a processor 63, and a power unit 65 in the figure, for example. FIG. 8 illustrates the terminal device with various components. However, it is to be understood that not all the illustrated components are required to be implemented. More or fewer components may be implemented instead. The preceding transmitter may be a physical component of a sending module in the embodiments. The processor may be an indication module, a first determination module, a second determination module, a third determination module, a fourth determination module, and a fifth determination module in the embodiments.

Figure 9:
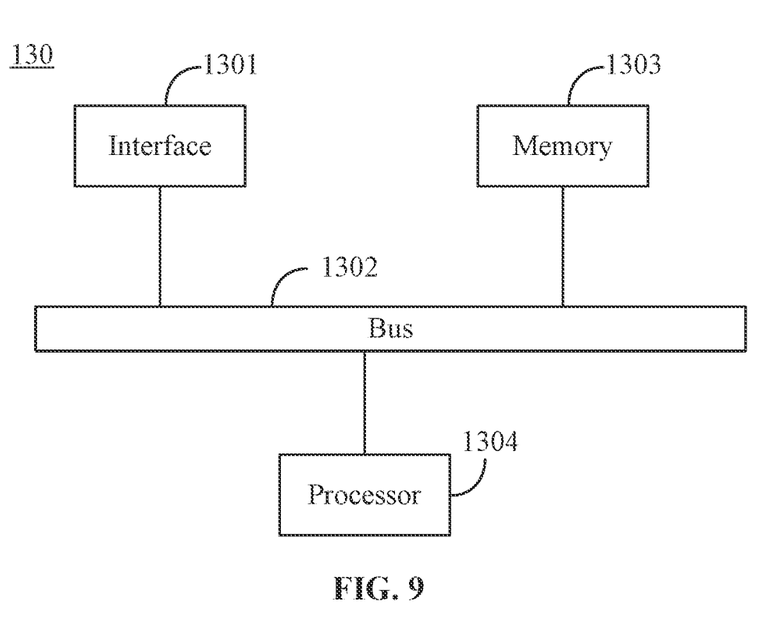
FIG. 9 is a structural diagram of a terminal device where a reporting apparatus is disposed according to an embodiment of the present application.

FIG. 9 is a structural diagram of a terminal device where an apparatus for sending a transmission channel state is disposed according to an embodiment of the present application. As shown in FIG. 9, a terminal device 130 includes a memory 1303 and a processor 1304. The terminal device 130 may further include an interface 1301 and a bus 1302. The interface 1301, the memory 1303, and the processor 1304 are connected through the bus 1302. The memory 1303 is configured to store an instruction. The processor 1304 is configured to read the instruction to perform the technical solutions of the preceding method embodiment applied to the terminal device. The implementation principles and technical effects are similar and not repeated here.

Figure 10:
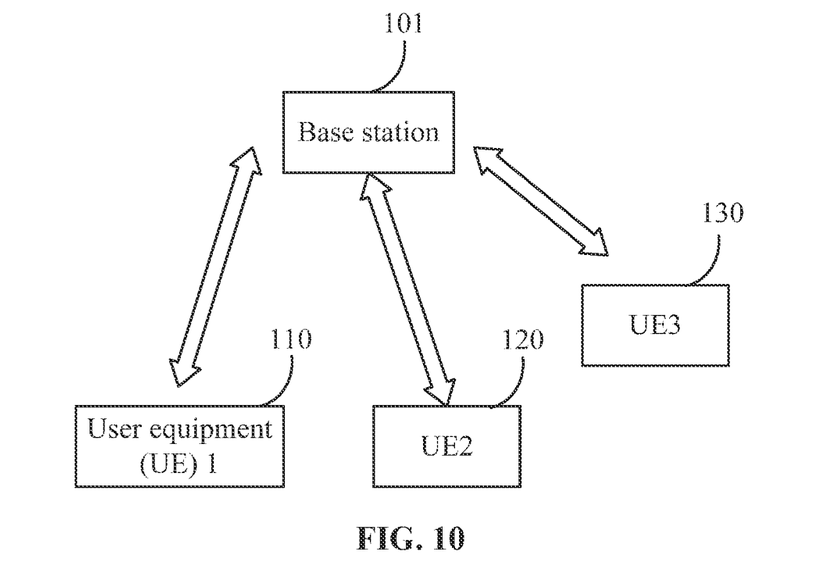
FIG. 10 is structural diagram one of a communication system according to an embodiment of the present application.
Figure 11:
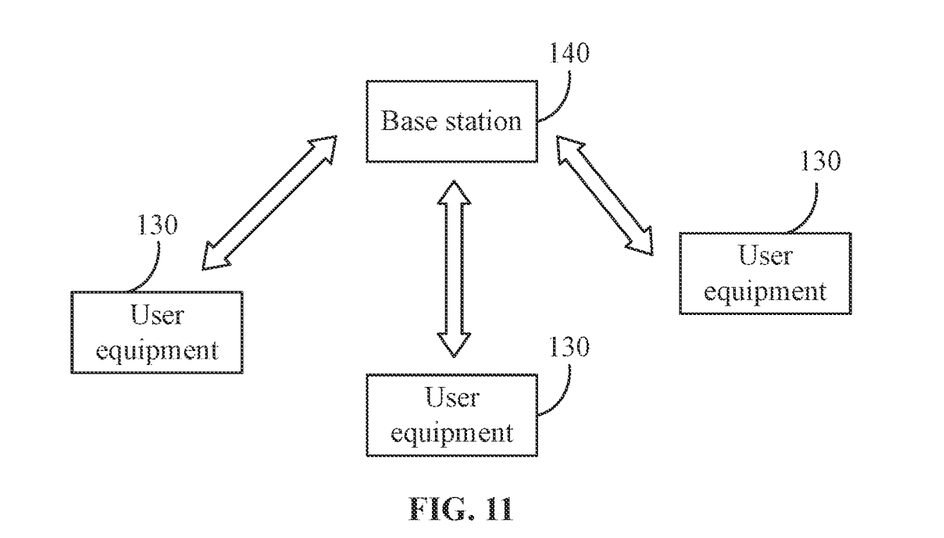
FIG. 11 is structural diagram two of a communication system according to an embodiment of the present application.

FIG. 10 is structural diagram one of a communication system according to an embodiment of the present application and FIG. 11 is structural diagram two of a communication system according to an embodiment of the present application. As shown in FIG. 10, in this embodiment, a description is provided by using an example in which a network side device is a base station 101 and a terminal device may be a UE 110, 120, or 130. The preceding base station and UE have the same functions as those in the preceding embodiment and are not repeated here. Alternatively, as shown in FIG. 11, the system includes the UE 130 in the preceding embodiment and a base station 140 in the preceding embodiment. Similarly, the base station in the figures may be a network device in the embodiments, the UE is the preceding terminal device, and the base station and the UE can implement functions the same as the preceding functions, which are not repeated here.

The above are only example embodiments of the present application and are not intended to limit the scope of the present application.

It is to be understood by those skilled in the art that the term "user terminal" covers any suitable type of radio UE, for example, a mobile phone, a portable data processing device, a portable web browser, or a vehicle-mounted mobile station.

In general, embodiments of the present application may be implemented in hardware or dedicated circuits, software, logic, or any combination thereof. For example, some aspects may be implemented in hardware while other aspects may be implemented in firmware or software that may be executed by a controller, a microprocessor, or other computing apparatuses, although the present application is not limited thereto.

Embodiments of the present application may be implemented by computer program instructions executed by a data processor of a mobile apparatus, for example, in a processor entity, may be implemented by hardware, or may be implemented by a combination of software and hardware. The computer program instructions may be assembly instructions, instruction set architecture (ISA) instructions, machine instructions, machine-related instructions, microcodes, firmware instructions, status setting data, or source or object codes written in any combination of one or more programming languages.

A block diagram of any logic flow in drawings of the present application may represent program steps, may represent interconnected logic circuits, modules, and functions, or may represent a combination of program steps, logic circuits, modules, and functions. Computer programs may be stored in a memory. The memory may be of any type suitable for a local technical environment and may be implemented using any suitable data storage technology. The memory in embodiments of the present application may be a volatile memory or a non-volatile memory or may include both a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), a flash memory, or the like. The volatile memory may be a random-access memory (RAM), which serves as an external cache. Many forms of RAMs may be used, such as a static random-access memory (SRAM), a dynamic random-access memory (DRAM), a synchronous dynamic random-access memory (SDRAM), a double data rate synchronous dynamic random-access memory (DDR SDRAM), an enhanced synchronous dynamic random-access memory (ESDRAM), a synchlink dynamic random-access memory (SLDRAM), and a direct rambus random-access memory (DRRAM). The memory of the system and the method described in the present application includes, but is not limited to, these and any other suitable type of memory.

The processor in embodiments of the present application may be of any type suitable for the local technical environment such as, but not limited to, a general-purpose computer, a special-purpose computer, a microprocessor, a digital signal processor (DSP), an application-specific integrated circuit (ASIC), a field-programmable gate array (FPGA), any other programmable logic device, a discrete gate or transistor logic device, a discrete hardware component, and a processor based on multi-core processor architecture. The general-purpose processor may be, for example, a microprocessor or any commonly used processor. The preceding processor may implement or execute steps of the methods in the embodiments of the present application. Software modules may be located in a random-access memory, a flash memory, a read-only memory, a programmable read-only memory, an electrically erasable programmable read-only memory, a register, or any other established storage medium in the art. The storage medium is located in the memory. The processor may read information in the memory and implement the steps of the preceding methods in combination with hardware.

What is claimed is:

1. A wireless communication resource configuration method, comprising:
   acquiring, by a first user equipment (UE), information about a group of UEs including the first UE in a sidelink multicast communication group, the information comprising identification information of at least the first UE in the sidelink multicast communication group and quantity information of the group of UEs in the sidelink multicast communication group; and
   determining, by the first UE, physical sidelink feedback channel (PSFCH) resource information of the first UE in the sidelink multicast communication group at least according to the identification information of the at least the first UE in the sidelink multicast communication group,
   wherein the identification information of the at least the first UE in the sidelink multicast communication group is acquired by notifying, by a non-access stratum (NAS) of the first UE, an access stratum (AS) of the first UE, of the identification information of the at least the first UE in the sidelink multicast communication group.

2. The wireless communication resource configuration method of claim 1, wherein the PSFCH resource information comprises a PSFCH resource pool or N PSFCH resources, N being an integer equal to or larger than 1.

3. The wireless communication resource configuration method of claim 1, wherein the quantity information of the group of UEs in the sidelink multicast communication group is acquired by notifying, by a non-access stratum (NAS) of the first UE, an access stratum (AS) of the first UE, of the quantity information of the group of UEs in the sidelink multicast communication group.

4. A non-transitory storage medium storing a computer program, wherein the computer program, when executed by at least one processor, causes the at least one processor to perform steps of claim 1.

5. The non-transitory storage medium of claim 4, wherein the PSFCH resource information comprises N PSFCH resources, N being an integer equal to or larger than 1.

6. The non-transitory storage medium of claim 4, wherein the quantity information of the one or more UEs in the sidelink multicast communication group is acquired by notifying, by a non-access stratum (NAS) of the first UE, an access stratum (AS) of the first UE, of the quantity information of the one or more UEs in the sidelink multicast communication group.

7. The wireless communication resource configuration method of claim 1, further comprising:
receiving, by the first UE, sidelink bearer configuration information configured by a network element device on a network side, wherein the sidelink bearer configuration information comprises service data adaptation protocol (SDAP) layer configuration information, the SDAP layer configuration information comprising transmission type information.

8. The wireless communication resource configuration method of claim 7, further comprising configuring, according to the transmission type information and a destination id, an SDAP entity corresponding to the destination id.

9. A wireless communication resource configuration method, comprising:
receiving, by a UE, sidelink bearer configuration information configured by a network element device on a network side, wherein the sidelink bearer configuration information comprises service data adaptation protocol (SDAP) layer configuration information, the SDAP layer configuration information comprising transmission type information; and
configuring, according to the transmission type information and a destination id, an SDAP entity corresponding to the destination id.

10. The wireless communication resource configuration method of claim 9, wherein the transmission type information comprises at least one of unicast, multicast, or broadcast.

11. A wireless communication apparatus, comprising:
a memory, storing a computer program;
at least one processor, configured to execute the computer program to cause the wireless communication apparatus to perform steps comprising:
acquiring, by a first user equipment (UE), information about a group of UEs including the first UE in a sidelink multicast communication group, the information comprising identification information of at least the first UE in the sidelink multicast communication group and quantity information of the group of UEs in the sidelink multicast communication group; and
determining, by the first UE, physical sidelink feedback channel (PSFCH) resource information of the first UE in the sidelink multicast communication group at least according to the identification information of the one at least the first sidelink multicast communication group,
wherein the identification information of the at least the first UE in the sidelink multicast communication group is acquired by notifying, by a non-access stratum (NAS) of the first UE, an access stratum (AS) of the first UE, of the identification information of the at least the first UE in the sidelink multicast communication group.

12. The wireless communication apparatus of claim 11, wherein the PSFCH resource information comprises N PSFCH resources, N being an integer equal to or larger than 1.

13. The wireless communication apparatus of claim 11, wherein the quantity information of the group of UEs in the sidelink multicast communication group is acquired by notifying, by a non-access stratum (NAS) of the first UE, an access stratum (AS) of the first UE, of the quantity information of the group of UEs in the sidelink multicast communication group.

14. A wireless communication apparatus, comprising:
a memory for storing a computer program;
at least one processor, configured to execute the computer program to cause the wireless communication apparatus to perform steps comprising:
receiving, by a first UE, sidelink bearer configuration information configured by a network element device on a network side, wherein the sidelink bearer configuration information comprises service data adaptation protocol (SDAP) layer configuration information, the SDAP layer configuration information comprising transmission type information; and
configuring, according to the transmission type information and a destination id, an SDAP entity corresponding to the destination id.

15. The wireless communication apparatus of claim 14, wherein the transmission type information comprises at least one of unicast, multicast, or broadcast.

* * * * *

UNITED STATES PATENT AND TRADEMARK OFFICE
CERTIFICATE OF CORRECTION

PATENT NO. : 12,273,859 B2  
APPLICATION NO. : 17/513506  
DATED : April 8, 2025  
INVENTOR(S) : Wei Luo et al.

Page 1 of 1

It is certified that error appears in the above-identified patent and that said Letters Patent is hereby corrected as shown below:

In the Claims

In Column 24, Claim 11, Lines 4 and 5, delete "the one at least the first sidelink" and replace with --the at least the first UE in the sidelink--.

Signed and Sealed this  
Second Day of December, 2025

John A. Squires  
*Director of the United States Patent and Trademark Office*